United States Patent
Peng et al.

(10) Patent No.: US 11,111,656 B2
(45) Date of Patent: Sep. 7, 2021

(54) TEMPERATURE-REGULATING DOUBLE-CONTROL AUTOMATIC FAUCET

(71) Applicant: Harda (Xiamen) Plastic Co., Ltd., Xiamen (CN)

(72) Inventors: Kesheng Peng, Xiamen (CN); Shengshen Zhan, Xiamen (CN)

(73) Assignee: HARDA INTELLIGENT TECHNOLOGIES CO., LTD., Xiamen (CN)

( * ) Notice: Subject to any disclaimer, the term of this patent is extended or adjusted under 35 U.S.C. 154(b) by 149 days.

(21) Appl. No.: 16/396,755

(22) Filed: Apr. 28, 2019

(65) Prior Publication Data

US 2020/0340221 A1  Oct. 29, 2020

(51) Int. Cl.
*E03C 1/04* (2006.01)
*F16K 31/60* (2006.01)
*E03C 1/05* (2006.01)

(52) U.S. Cl.
CPC .......... *E03C 1/0412* (2013.01); *F16K 31/605* (2013.01); *E03C 1/055* (2013.01); *E03C 2001/0418* (2013.01); *Y10T 137/9464* (2015.04)

(58) Field of Classification Search
None
See application file for complete search history.

(56) References Cited

U.S. PATENT DOCUMENTS

| | | | | |
|---|---|---|---|---|
| 6,202,980 B1* | 3/2001 | Vincent | ..................... | E03C 1/05 251/129.04 |
| 7,743,788 B2* | 6/2010 | Schmitt | ................... | C02F 9/005 137/554 |
| 8,479,765 B1* | 7/2013 | Wren | .................... | E03C 1/0404 137/551 |
| 2003/0033868 A1* | 2/2003 | Posey | ................. | F16K 37/0041 73/168 |
| 2004/0032749 A1* | 2/2004 | Schindler | .............. | E03C 1/0412 362/555 |
| 2005/0150556 A1* | 7/2005 | Jonte | ........................ | E03C 1/057 137/613 |
| 2008/0289098 A1* | 11/2008 | Kunkel | ................. | E03C 1/0412 4/623 |
| 2009/0114036 A1* | 5/2009 | Dhulipudi | ........... | F16K 37/0041 73/861.11 |
| 2010/0006166 A1* | 1/2010 | Chen | ........................ | E03C 1/055 137/801 |
| 2011/0210276 A1* | 9/2011 | Chen | .................... | G05D 7/0629 251/129.01 |
| 2014/0026997 A1* | 1/2014 | Mielke | ..................... | E03C 1/04 137/801 |

(Continued)

*Primary Examiner* — Robert K Arundale
*Assistant Examiner* — Richard K. Durden
(74) *Attorney, Agent, or Firm* — Leong C. Lei

(57) ABSTRACT

A temperature-regulating double-control automatic faucet includes a faucet body, a single-handle double-control mixed water valve core having a lever, a solenoid valve, a water pipe assembly, a controller, a magnetic induction device, and a proximity sensor. The single-handle double-control mixed water valve core is installed in the faucet body cylinder. The magnetic induction device is configured to detect a position change of the lever. The proximity sensor is configured to sense a manual operation. The automatic faucet has a manual control mode and a sensing control mode for use, which can be used conveniently.

20 Claims, 10 Drawing Sheets

(56) References Cited

U.S. PATENT DOCUMENTS

| | | | |
|---|---|---|---|
| 2015/0292187 A1* | 10/2015 | Tseng | E03C 1/0412 |
| | | | 4/677 |
| 2016/0208947 A1* | 7/2016 | Song | E03C 1/055 |
| 2016/0238152 A1* | 8/2016 | Esche | F16K 31/06 |
| 2017/0275860 A1* | 9/2017 | Beck | E03C 1/0412 |
| 2017/0306596 A1* | 10/2017 | Sawaski | E03C 1/0412 |
| 2018/0106022 A1* | 4/2018 | Kamiyoshi | F16K 31/605 |
| 2018/0172264 A1* | 6/2018 | Heuer | F21V 33/004 |
| 2018/0195711 A1* | 7/2018 | Schneider, II | F21V 33/004 |
| 2019/0101219 A1* | 4/2019 | Hatakeyama | F16K 31/04 |

* cited by examiner

TEMPERATURE-REGULATING DOUBLE-CONTROL AUTOMATIC FAUCET

BACKGROUND OF THE INVENTION

1. Field of the Invention

The present invention relates to a faucet, and more particularly to a temperature-regulating double-control automatic faucet.

2. Description of the Prior Art

A conventional automatic faucet is equipped with a proximity sensor on the faucet body to sense the presence of the human body, thereby controlling the opening and closing of the solenoid valve disposed on the waterway of the automatic faucet so as to control the automatic faucet to discharge water or not. In order to meet the user's demand for adjusting the water temperature, the conventional automatic faucet with a temperature adjustment function is provided with a single-handle double-control mixed water valve core on the water inlet waterway of the faucet. The water outlet end of the single-handle dual-control mixed water valve core is connected to the water inlet end of the solenoid valve. For ease of operation, the lever of the single-handle dual-control mixed water valve core is in cooperation with a handle. In use, the user first pulls the lever of the single-handle double-control mixed water valve core to open the single-handle double-control mixed water valve core, and then rotates the lever of the single-handle double-controlled mixed water valve core to control the effluent water temperature of the single-handle double-controlled mixed water valve core. Finally, the solenoid valve controls the automatic faucet to discharge water through the proximity sensor sensing the human body. However, for the automatic faucet with a temperature adjustment function, in use, if the solenoid valve is in the closed state and the user manually operates the lever and opens the single-handle double-control mixed water valve core, the automatic faucet cannot immediately discharge water. It is required for the proximity sensor to sense the human body for opening the solenoid valve so that the automatic faucet can discharge water. In this way, the automatic faucet with a temperature adjustment function doesn't have a manual operation mode. It is inconvenient for use.

SUMMARY OF THE INVENTION

The primary object of the present invention is to provide a temperature-regulating double-control automatic faucet having a manual control mode and a sensing control mode.

In order to achieve the above object, the present invention adopts the following technical solutions:

According to one aspect of the present invention, a temperature-regulating double-control automatic faucet comprises a faucet body, a single-handle double-control mixed water valve core having a lever, a solenoid valve, a water pipe assembly, a controller, a magnetic induction device, and a proximity sensor. The faucet body is provided with a spout and a mounting cylinder, the mounting cylinder having an inner end opening and an outer end opening. The single-handle double-control mixed water valve core is installed in the mounting cylinder. The lever of the single-handle double-control mixed water valve core is movable between an open position and a closed position for opening and closing the single-handle double-control mixed water valve core. The lever of the single-handle double-control mixed water valve core is rotatable between a cold water position and a hot water position for controlling the proportion of cold water and hot water flowing into the single-handle double-control mixed water valve core. The water pipe assembly includes a cold water inlet pipe, a hot water inlet pipe, a primary mixed water outlet pipe, and a secondary mixed water outlet pipe. One end of the hot water inlet pipe is in communication with a hot water inlet of the single-handle double-control mixed water valve core. One end of the cold water inlet pipe is in communication with a cold water inlet of the single-handle double-control mixed water valve core. One end of the primary mixed water outlet pipe is in communication with a mixed water outlet of the single-handle double-control mixed water valve core. Another end of the primary mixed water outlet pipe is in communication with an inlet of the solenoid valve. One end of the secondary mixed water outlet pipe is in communication with an outlet of the solenoid valve. Another end of the secondary mixed water outlet pipe is in communication with the spout of the faucet body. The magnetic induction device is configured to detect a position change of the lever between the open position and the closed position. The magnetic induction device includes a magnetic assembly and a magnetic sensor for sensing a position change of the magnetic assembly. One of the magnetic assembly and the magnetic sensor is fitted on the lever of the single-handle double-control mixed water valve core. The other of the magnetic assembly and the magnetic sensor is fitted between the single-handle double-control mixed water valve core and the mounting cylinder. The magnetic sensor is electrically connected to the controller. The proximity sensor is configured to sense a human body. The proximity sensor is fixed on the faucet body and electrically connected to the controller. When the controller detects that the lever is pulled to the open position through the magnetic induction device, the single-handle double-control mixed water valve core is opened, and the controller first controls the solenoid valve to be opened, and then the controller senses the human body through the proximity sensor to control the solenoid valve to be selectively opened and closed.

Preferably, the magnetic assembly is fitted on the lever of the single-handle double-control mixed water valve core, and the magnetic sensor is fitted between the single-handle double-control mixed water valve core and the mounting cylinder.

Preferably, the magnetic assembly includes a magnetic cylinder holder and at least three magnetic cylinders fitted to the magnetic cylinder holder. The magnetic cylinder holder is fixed on the lever. The magnetic cylinders are arranged in an arc shape on the magnetic cylinder holder, and a distance from each of the magnetic cylinders to a center axis of the lever is equal.

Preferably, the magnetic assembly includes a magnetic plate holder and a fan-shaped magnetic plate fitted to the magnetic plate holder. The magnetic plate holder is fixed on the lever, and a center point of a radius of curvature of the fan-shaped magnetic plate is located on a central axis of the lever.

Preferably, the outer end opening of the mounting cylinder is provided with a decorative cover for covering the outer end opening of the mounting cylinder. The decorative cover has a through hole for the lever to pass through. The magnetic sensor is fixed in the decorative cover.

Preferably, the magnetic sensor is fitted on the lever of the single-handle double-control mixed water valve core, and the magnetic assembly is fitted between the single-handle double-control mixed water valve core and the mounting cylinder.

Preferably, the outer end opening of the mounting cylinder is provided with a decorative cover for covering the outer end opening of the mounting cylinder. The decorative cover has a through hole for the lever to pass through. The magnetic assembly includes at least three magnetic cylinders. The magnetic cylinders are arranged in an arc shape and fitted in the decorative cover, and a distance from each of the magnetic cylinders to a central axis of the decorative cover is equal.

Preferably, the outer end opening of the mounting cylinder is provided with a decorative cover for covering the outer end opening of the mounting cylinder. The decorative cover has a through hole for the lever to pass through. The magnetic assembly includes a fan-shaped magnetic plate fitted in the decorative cover, and a center point of a radius of curvature of the fan-shaped magnetic plate is located on a central axis of the decorative cover.

Preferably, the temperature-regulating double-control automatic faucet further comprises a temperature sensing member and an indicator light. The temperature sensing member is fixed in the faucet body and configured to sense the water temperature of water flowing out of the mixed water outlet of the single-handle double-control mixed water valve core. The indicator light is fixed on the faucet body. The temperature sensing member and the indicator light are electrically connected to the controller. When the controller detects that the lever is pulled to the open position through the magnetic induction device, the controller controls the indicator light to work, and the controller obtains the water temperature of the water flowing out of the mixed water outlet through the temperature sensing member and controls the color of light emitted by the indicator light according to the water temperature.

Preferably, both the proximity sensor and the indicator light are located on one side of the faucet body and arranged adjacent to each other.

According to another aspect of the present invention, a temperature-regulating double-control automatic faucet comprises a faucet body, a single-handle double-control mixed water valve core having a lever, a solenoid valve, a water pipe assembly, a controller, a magnetic induction device, and a proximity sensor. The single-handle double-control mixed water valve core is installed in the mounting cylinder. The lever of the single-handle double-control mixed water valve core is movable between an open position and a closed position for opening and closing the single-handle double-control mixed water valve core. The lever of the single-handle double-control mixed water valve core is rotatable between a cold water position and a hot water position for controlling the proportion of cold water and hot water flowing into the single-handle double-control mixed water valve core. The water pipe assembly includes a cold water inlet pipe, a hot water inlet pipe, a primary mixed water outlet pipe, and a secondary mixed water outlet pipe. One end of the hot water inlet pipe is in communication with a hot water inlet of the single-handle double-control mixed water valve core. One end of the cold water inlet pipe is in communication with a cold water inlet of the single-handle double-control mixed water valve core. One end of the primary mixed water outlet pipe is in communication with a mixed water outlet of the single-handle double-control mixed water valve core. Another end of the primary mixed water outlet pipe is in communication with an inlet of the solenoid valve. One end of the secondary mixed water outlet pipe is in communication with an outlet of the solenoid valve. Another end of the secondary mixed water outlet pipe is in communication with the spout of the faucet body. The magnetic induction device is configured to detect a position change of the lever between the open position and the closed position. The magnetic induction device includes a magnetic assembly and a magnetic sensor for sensing a position change of the magnetic assembly. One of the magnetic assembly and the magnetic sensor is fitted on the lever of the single-handle double-control mixed water valve core. The other of the magnetic assembly and the magnetic sensor is fitted between the single-handle double-control mixed water valve core and the mounting cylinder. The magnetic sensor is electrically connected to the controller. The proximity sensor is configured to sense a human body. The proximity sensor is fixed on the faucet body and electrically connected to the controller. When the controller detects that the lever is pulled to the closed position through the magnetic induction device, the single-handle double-control mixed water valve core is closed, and the controller controls the solenoid valve to be opened; when the controller detects that the lever is pulled to the open position through the magnetic induction device, the controller senses the human body through the proximity sensor to control the solenoid valve to be selectively opened and closed.

After adopting the above solutions, when the controller detects that the lever is pulled to the open position through the magnetic induction device, the controller controls the solenoid valve to be opened; or when the controller detects that the lever is pulled to the closed position through the magnetic induction device, the controller controls the solenoid valve to be opened. Therefore, when the user pulls the lever from the closed position to the open position, both the single-handle double-control mixed water valve core and the solenoid valve are opened, allowing the automatic faucet to discharge water. When the user pulls the lever from the open position to the closed position, the single-handle double-control mixed water valve core is closed, so that the automatic faucet does not discharge water. Thus, the present invention can directly control the automatic faucet to discharge water or not by pulling the lever, so that the present invention has a manual control mode for use. After the lever is pulled to the open position, the controller of the present invention controls the solenoid valve to be selectively opened and closed through the proximity sensor to sense the nual operation human body so as to control the automatic faucet to discharge water or not, thereby enabling the invention to have a sensing control mode for use.

DETAILED DESCRIPTION OF THE PREFERRED EMBODIMENTS

Figure 1:
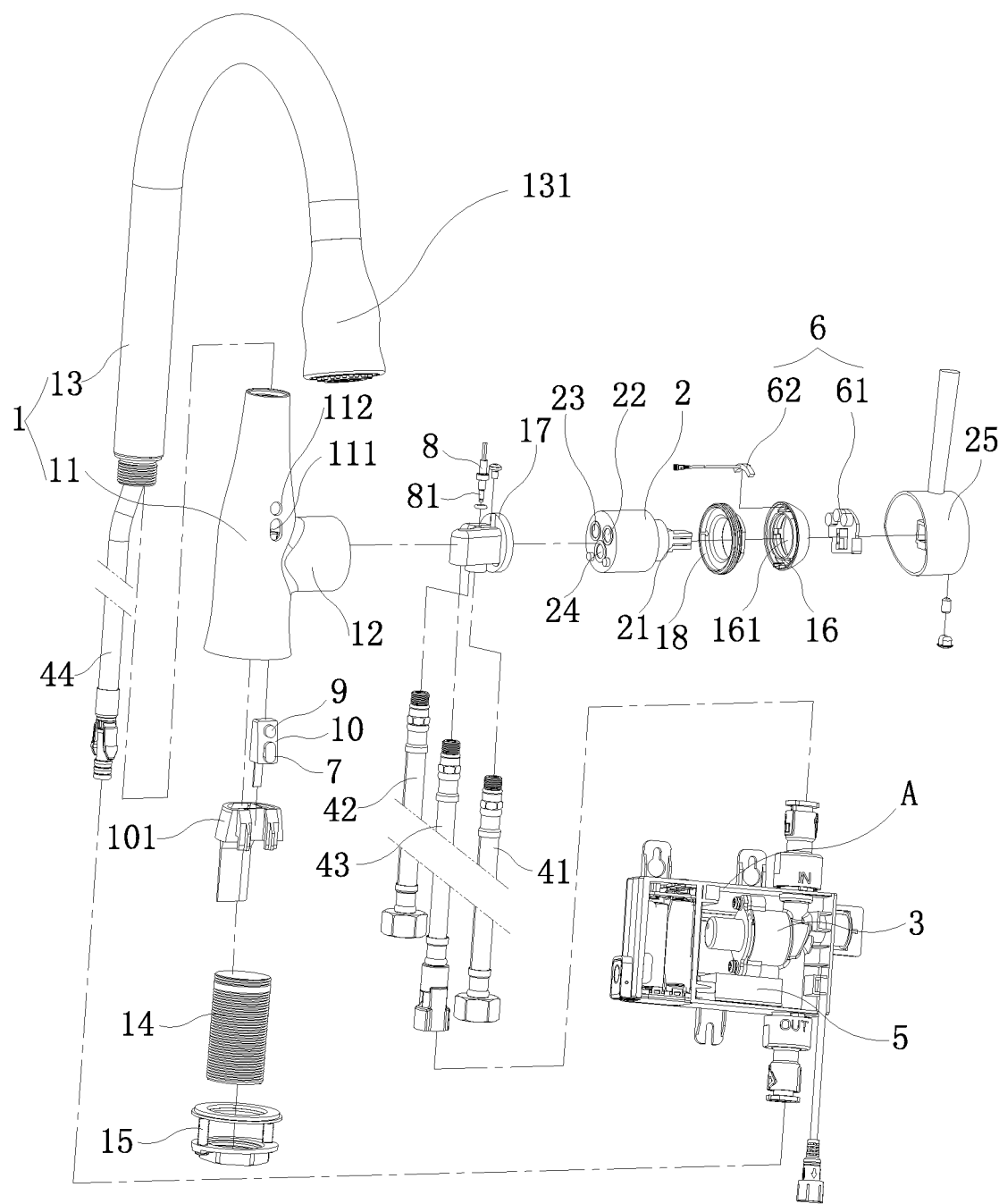
FIG. 1 is an exploded view according to a first embodiment of the present invention.
Figure 2:
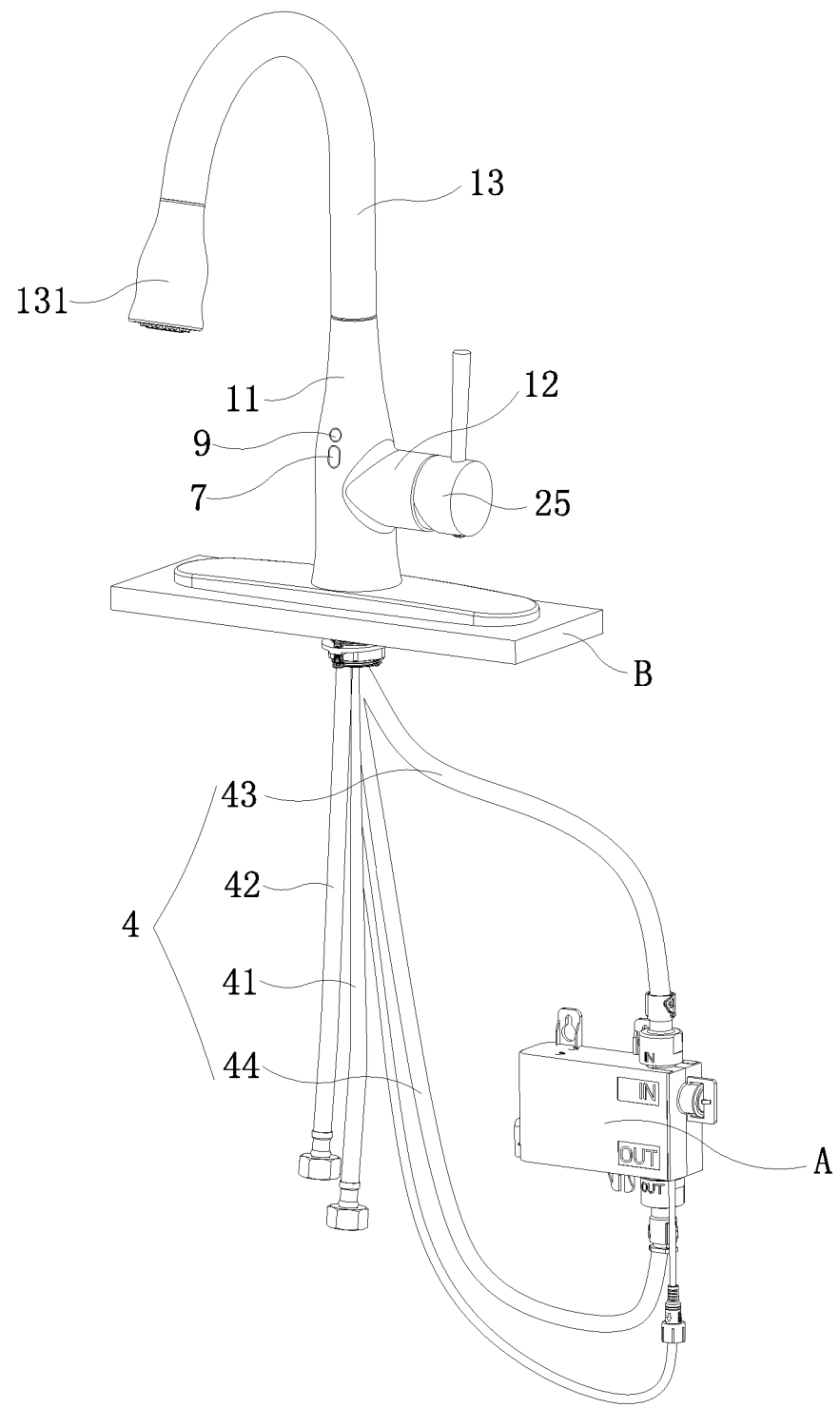
FIG. 2 is a perspective view according to the first embodiment of the present invention.

Embodiments of the present invention will now be described, by way of example only, with reference to the accompanying drawings.

First Embodiment

As shown in FIG. 1 to FIG. 9, in this embodiment, a temperature-regulating double-control automatic faucet comprises a faucet body 1, a single-handle double-control mixed water valve core 2 having a lever 21, a solenoid valve 3, a water pipe assembly 4, a controller 5, a magnetic induction device 6, a proximity sensor 7, a temperature sensing member 8, and an indicator light 9. The solenoid valve 3 is electrically connected to the controller 5. The solenoid valve 3 and the controller 5 are mounted in a control box A.

The faucet body 1 includes a base 11 and a curved pipe 13 fixed to the base 1. One end of the curved pipe 13 is connected to the base 11. Another end of the curved pipe 13 is provided with a spout 131. One side of the base 11 is provided with a mounting cylinder 12 for mounting the single-handle double-control mixed water valve core 2. The mounting cylinder 12 has two end openings. The inner end opening of the mounting cylinder 12 is in communication with the inner chamber of the base 11. The outer end opening of the mounting cylinder 112 is provided with a decorative cover 16 for covering the outer end opening of the mounting cylinder 112. The decorative cover 16 has a through hole 161 for the lever 21 to pass through. A threaded pipe 14 is connected to the bottom of the base 11. The faucet body 1 is fixedly connected to a countertop B by a nut 15 in cooperation with the threaded pipe 14.

The single-handle double-control mixed water valve core 2 is installed in the mounting cylinder 12. The lever 21 of the single-handle double-control mixed water valve core 2 is moveable between an open position and a closed position for opening and closing the single-handle double-control mixed water valve core 2. The lever 21 of the single-handle double-control mixed water valve core 2 is rotatable between a cold water position and a hot water position for controlling the proportion of cold water and hot water flowing into the single-handle double-control mixed water valve core 2. The single-handle double-control mixed water valve core 2 is a conventional structure, and won't be described hereinafter. The inner end opening of the mounting cylinder 12 is provided with a valve seat 17. The valve seat 17 has a cold water passage 171, a hot water passage 172, and a mixed water passage 173. The single-handle double-control mixed water valve core 2 is inserted into the mounting cylinder 12, and the single-handle double-control mixed water valve core 2 abuts against the valve seat 17. A cold water inlet 22, a hot water inlet 23 and a mixed water outlet 24 of the single-handle double-control mixed water valve core 2 are in communication with the cold water passage 171, the hot water passage 172, and the mixed water passage 173, respectively. A valve cover 18 is screwedly connected to the outer end opening of the mounting cylinder 12. The valve cover 18 presses the single-handle double-control mixed water valve core 2, so that the single-handle double-control mixed water valve core 21 abuts against the valve seat 17 tightly. The lever 21 of the single-handle double-control mixed water valve core 2 passes through the valve cover 18. The lever 21 of the single-handle double-control mixed water valve core 2 is detachably connected to a handle 25 for the user to manipulate the lever 21. The handle 25 is locked to the lever 21 by screws. The through hole 161 of the decorative cover 16 is fitted on the valve cover 18 and is in an interference fit with the valve cover 18 to ensure that the decorative cover 16 is securely fitted onto the outer end opening of the mounting cylinder 12.

The water pipe assembly 4 includes a cold water inlet pipe 41, a hot water inlet pipe 42, a primary mixed water outlet pipe 43, and a secondary mixed water outlet pipe 44. The cold water inlet pipe 41, the hot water inlet pipe 42, the primary mixed water outlet pipe 43 and the secondary mixed water outlet pipe 44 are inserted in the faucet body 1. One end of the cold water inlet pipe 41, one end of the hot water inlet pipe 42 and one end of the primary mixed water outlet pipe 43 are in communication with the cold water passage 171, the hot water passage 172 and the mixed water passage 173 of the valve seat 17, respectively, so that one end of the hot water inlet pipe 42 is in communication with the hot water inlet 23 of the single-handle double-control mixed water valve core 2, and one end of the cold water inlet pipe 41 is in communication with the cold water inlet 22 of the single-handle double-control mixed water valve core 2, and one end of the primary mixed water outlet pipe 43 is in communication with the mixed water outlet 24 of the single-handle double-control mixed water valve core 2. Another end of the primary mixed water outlet pipe 43 is in communication with an inlet of the solenoid valve 3. One end of the secondary mixed water outlet pipe 44 is in communication with an outlet of the solenoid valve 3, and another end of the secondary mixed water outlet pipe 44 is in communication with the spout 13 of the faucet body 1.

Figure 3:
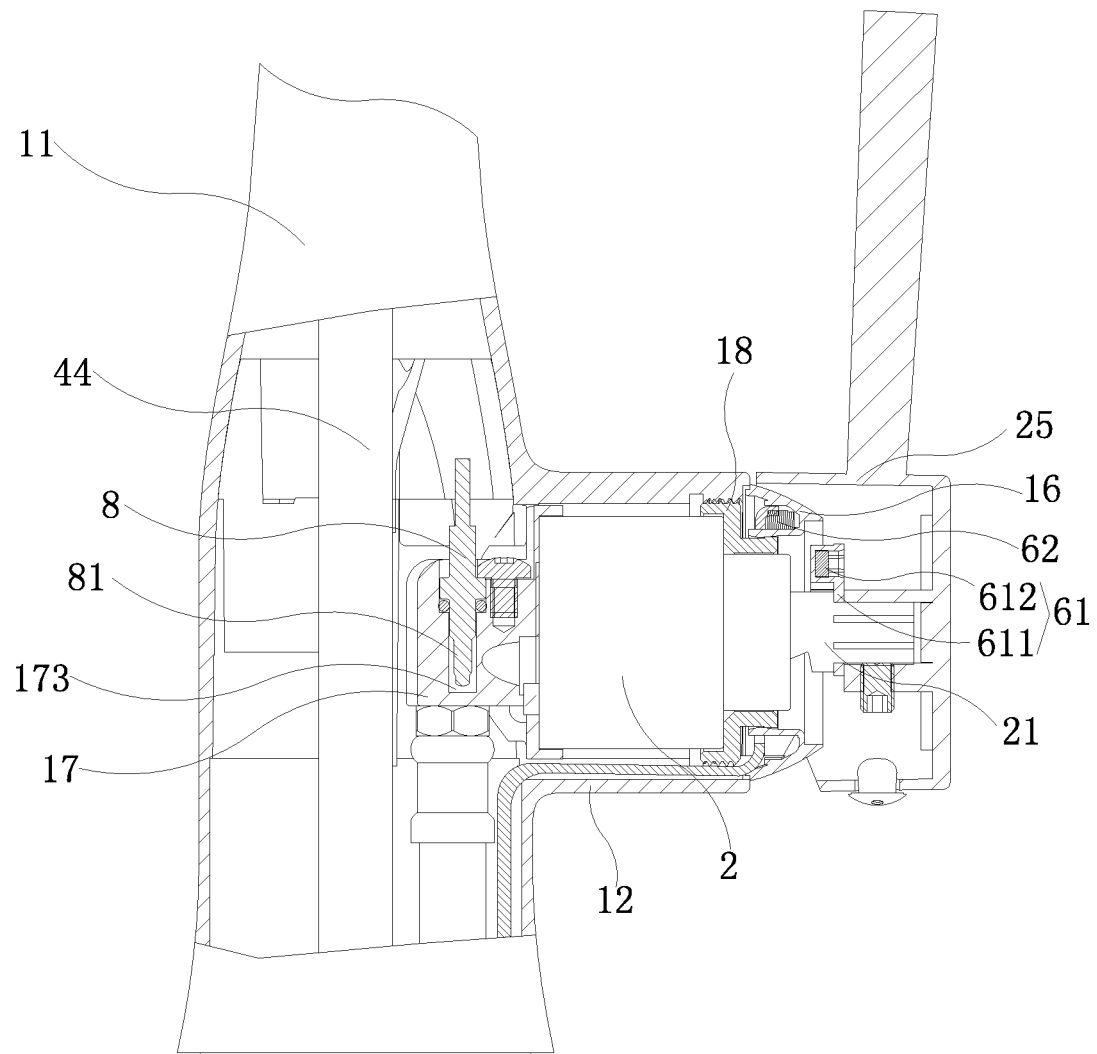
FIG. 3 is a first partial sectional view according to the first embodiment of the present invention, showing that the lever is pulled to the closed position.
Figure 4:
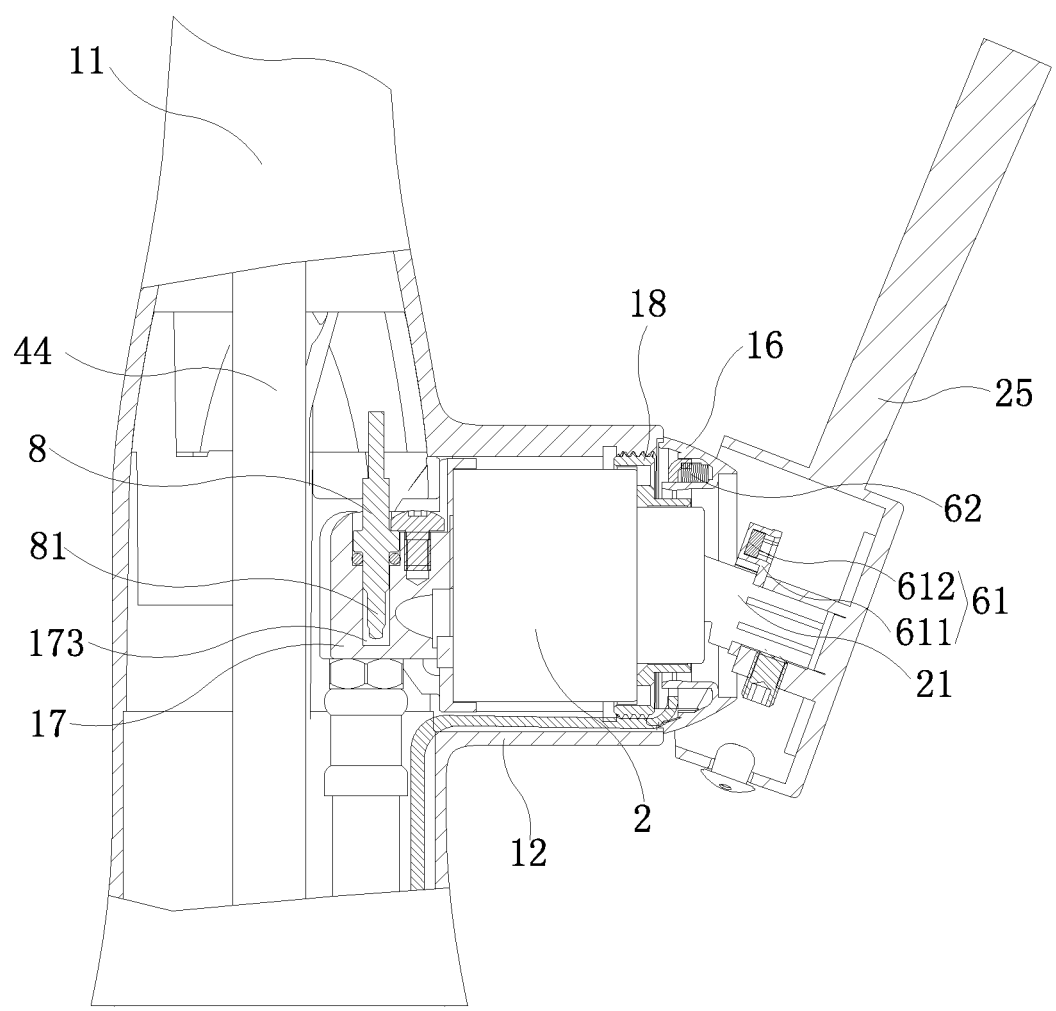
FIG. 4 is a second partial sectional view according to the first embodiment of the present invention, showing that the lever is pulled to the open position.
Figure 5:
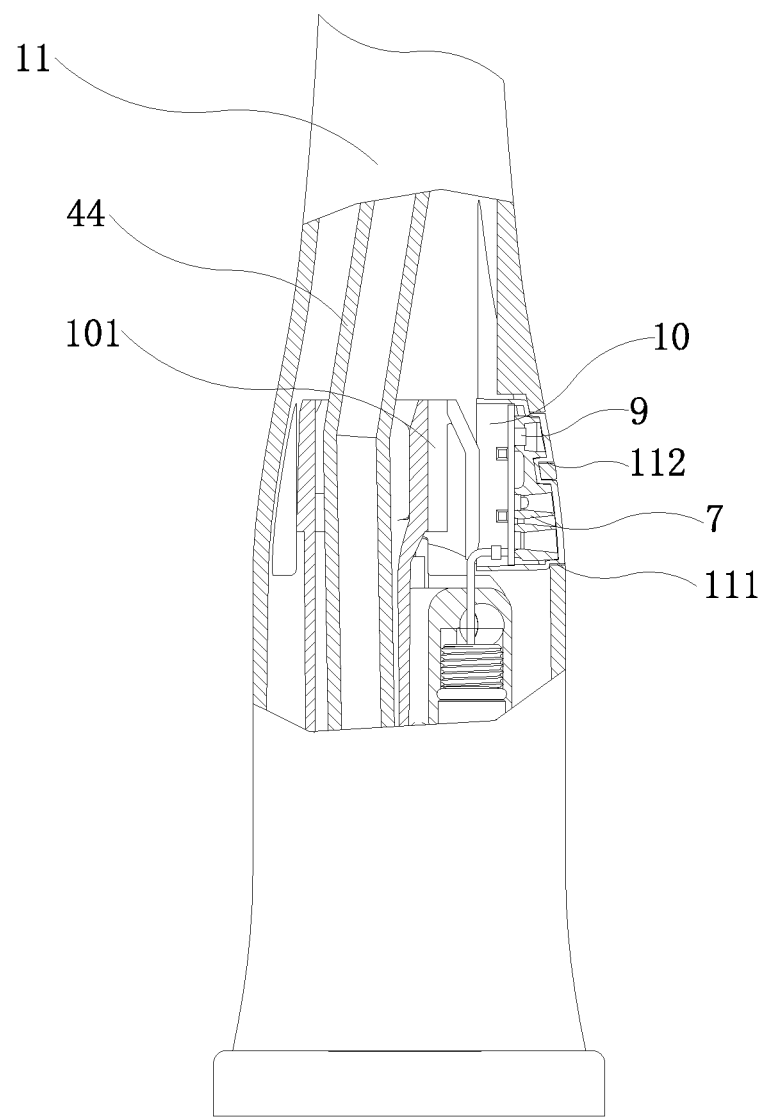
FIG. 5 is a third partial sectional view according to the first embodiment of the present invention.
Figure 6:
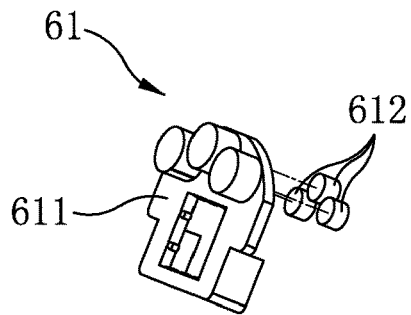
FIG. 6 is an exploded view of an example of the magnetic assembly according to the first embodiment of the present invention.
Figure 7:
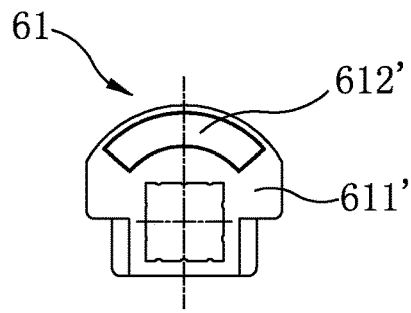
FIG. 7 is a schematic view of another example of the magnetic assembly according to the first embodiment of the present invention.
Figure 8:
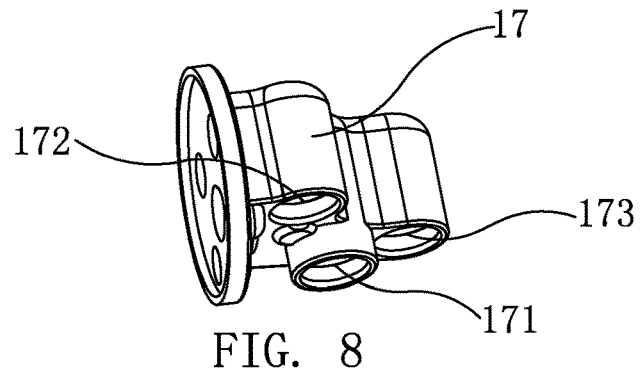
FIG. 8 is a schematic view of the valve seat according to the first embodiment of the present invention.
Figure 9:
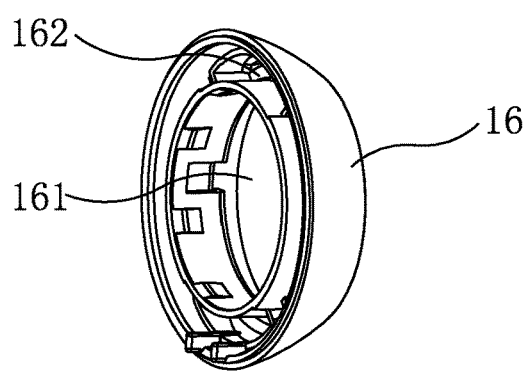
FIG. 9 is a schematic view of decorative cover according to the first embodiment of the present invention.

The magnetic induction device 6 is configured to detect a position change of the lever 21 between the open position and the closed position, so that the controller 5 can detect that the lever 21 is pulled to the closed position or the open position through the magnetic induction device 6. Specifically, the magnetic induction device 6 includes a magnetic assembly 61 and a magnetic sensor 62 for sensing a position change of the magnetic assembly 61. The magnetic assembly 61 is fitted on the lever 21 of the single-handle double-control mixed water valve core 2. The magnetic sensor 62 is fitted between the single-handle double-control mixed water valve core 2 and the mounting cylinder 12. The magnetic sensor 62 is electrically connected to the controller 5. As shown in FIG. 4, when the lever 21 is pulled to the open position, the single-handle double-control mixing valve spool 2 is opened and the lever 21 drives the magnetic assembly 61 away from the magnetic sensor 62. At this time, the magnetic sensor 62 senses that the magnetic assembly 61 is away from the magnetic sensor 62 to generate a first signal output to the controller 5. The controller 5 receives the first signal and determines that the lever 21 is pulled to the open position. As shown in FIG. 3, when the lever 21 is pulled to the closed position, the single-handle double-control mixed water valve core 2 is closed and the lever 21 drives the magnetic assembly 61 to approach the magnetic sensor 62. At this time, the magnetic sensor 62 senses that the magnetic assembly 61 is close to the magnetic sensor 62 to generate a second signal output to the controller 5. The controller 5 receives the second signal and determines that the lever 21 is pulled to the closed position. Thus, the controller 5 can detect that the lever 21 is pulled to the closed position or the open position through the magnetic induction device 6. The magnetic sensor 62 may be fixed to the decorative cover 16. The decorative cover 16 is provided with an engaging groove 162 for engaging the magnetic sensor 62. The magnetic sensor 62 may be a Hall-effect sensor. The magnetic sensor 62 may be a magnetic reed sensor. As shown in FIG. 6, the magnetic assembly 61 may include a magnetic cylinder holder 611 and at least three magnetic cylinders 612 fitted to the magnetic cylinder holder 611. The magnetic cylinder holder 611 is fixed on the lever 21. The magnetic cylinder holder 611 is fitted on the lever 21 and is in an interference fit with the lever 21. The magnetic cylinders 612 are arranged in an arc shape on the magnetic cylinder holder 611. The distance from each of the magnetic cylinders 612 to the lever 21 is equal. In this way, the area of the magnetic assembly 61 that can be sensed by the magnetic sensor 62 is large, thereby ensuring that the magnetic sensor 62 can sense the magnetic assembly 61 when the lever 21 is rotated. As shown in FIG. 7, the magnetic assembly 61 may include a magnetic plate holder 611' and a fan-shaped magnetic plate 612' fitted to the magnetic plate holder 611'. The magnetic plate holder 611' is fixed on the lever 21. The magnetic plate holder 611' is fitted on the lever 21 and is in an interference fit with the lever 21. The center of the fan-shaped magnetic plate 612' is located on the central axis of the lever 21. In this way, the area of the magnetic assembly 61 that can be sensed by the magnetic sensor 62 is large, thereby ensuring that the magnetic sensor 62 can sense the magnetic assembly 61 when the lever 21 is rotated.

The proximity sensor 7 is configured to sense a human body. The proximity sensor 7 may be an infrared sensor, a microwave sensor, an ultrasonic sensor or a laser sensor. The proximity sensor 7 is fixed on the faucet body 1 and electrically connected to the controller 5. The temperature sensing member 8 is fixed in the faucet body 1 and electrically connected to the controller 5. The temperature sensing member 8 is configured to sense the water temperature of the water flowing out of the mixed water outlet 24 of the single-handle double-control mixed water valve core 2. The indicator light 9 is fixed on the faucet body 1 and electrically connected to the controller 5. The proximity sensor 7 and the indicator light 9 may be located on the same side of the faucet body 1. The proximity sensor 7 and the indicator light 9 are arranged adjacent to each other. Specifically, the proximity sensor 7 and the indicator lamp 9 may be disposed on a circuit board 10. The circuit board 10 is fitted in the faucet body 1 through a fixing seat 101. The circuit board 10 is insertedly connected to the fixing seat 101. The fixing base 101 is engaged in the base 11 of the faucet body 1. The faucet body 1 is formed with a first opening 111 and a second opening 112 adjacent to each other and corresponding to the proximity sensor 7 and the indicator light 9. The proximity sensor 7 is disposed in the first opening 111. The indicator light 9 is disposed in the second opening 112. The first opening 111 and the second opening 112 are disposed on the base 11. The temperature sensing member 8 is fixed on the valve seat 17. A temperature sensing end 81 of the temperature sensing member 8 extends into the mixed water passage 173 to sense the water temperature of the water flowing out of the mixed water outlet 24.

In use, when the controller 5 detects that the lever 21 is pulled to the open position through the magnetic induction device 6, the single-handle double-control mixed water valve core 2 is opened, and the controller 5 first controls the solenoid valve 3 to be opened, thereby allowing the automatic faucet to discharge water. Then, the controller 5 senses the human body through the proximity sensor 7 to control the opening and closing of the solenoid valve 3, thereby controlling the automatic faucet to discharge water or not. The control mode of the controller 5 for controlling the opening and closing of the solenoid valve 3 through the proximity sensor 7 is that the controller 5 controls the solenoid valve 3 to switch between the open state and the closed state every time the proximity sensor 7 senses the human body. When the controller 5 detects that the lever 21 is pulled to the open position through the magnetic induction device 6, the controller 5 also controls the indicator light 9 to work. Besides, the controller 5 obtains the water temperature of the water flowing out of the mixed water outlet 24 through the temperature sensing member 8 and controls the color of the light emitted by the indicator light 21 according to the water temperature, so that the user can know the water temperature according to the color of the light emitted by the indicator light 21. Because the proximity sensor 7 and the indicator light 9 are located on the same side of the faucet body 1 and the proximity sensor 7 and the indicator light 9 are arranged adjacent to each other, such that the indicator light 9 can indicate the position of the proximity sensor 7 for the user to look for the proximity sensor 7 easily.

In an alternative way of use, when the controller 5 detects that the lever 21 is pulled to the closed position through the magnetic induction device 6, the single-handle double-control mixed water valve core 2 is closed, and the controller 5 controls the solenoid valve 3 to be opened. Thus, when the user pulls the lever 21 from the closed position to the open position, both the single-handle double-control mixed water valve core 2 and the solenoid valve 3 are opened, allowing the automatic faucet to discharge water. When the controller 5 detects that the lever 21 is pulled to the open position through the magnetic induction device 6, the single-handle double-control mixed water valve core 2 is opened. At this time, the controller 5 senses the human body through the proximity sensor 7 to control the opening and closing of the solenoid valve 3, thereby controlling the automatic faucet to discharge water or not.

In summary, when the controller 5 detects that the lever 21 is pulled to the open position through the magnetic induction device 6, the controller 5 controls the solenoid valve 3 to be opened; or when the controller 5 detects that the lever 21 is pulled to the closed position through the magnetic induction device 6, the controller 5 controls the solenoid valve 3 to be opened. Therefore, when the user pulls the lever 21 from the closed position to the open position, both the single-handle double-control mixed water valve core 2 and the solenoid valve 3 are opened, allowing the automatic faucet to discharge water. When the user pulls the lever 21 from the open position to the closed position, the single-handle double-control mixed water valve core 2 is closed, so that the automatic faucet does not discharge water. Thus, the present invention can directly control the automatic faucet to discharge water or not by pulling the lever 21, so that the present invention has a manual control mode for use. After the lever 21 is pulled to the open position, the controller 5 of the present invention controls the solenoid valve 3 to be selectively opened and closed through the proximity sensor 7 to sense the human body so as to control the automatic faucet to discharge water or not, thereby enabling the invention to have a sensing control mode for use.

Second Embodiment

Figure 10:
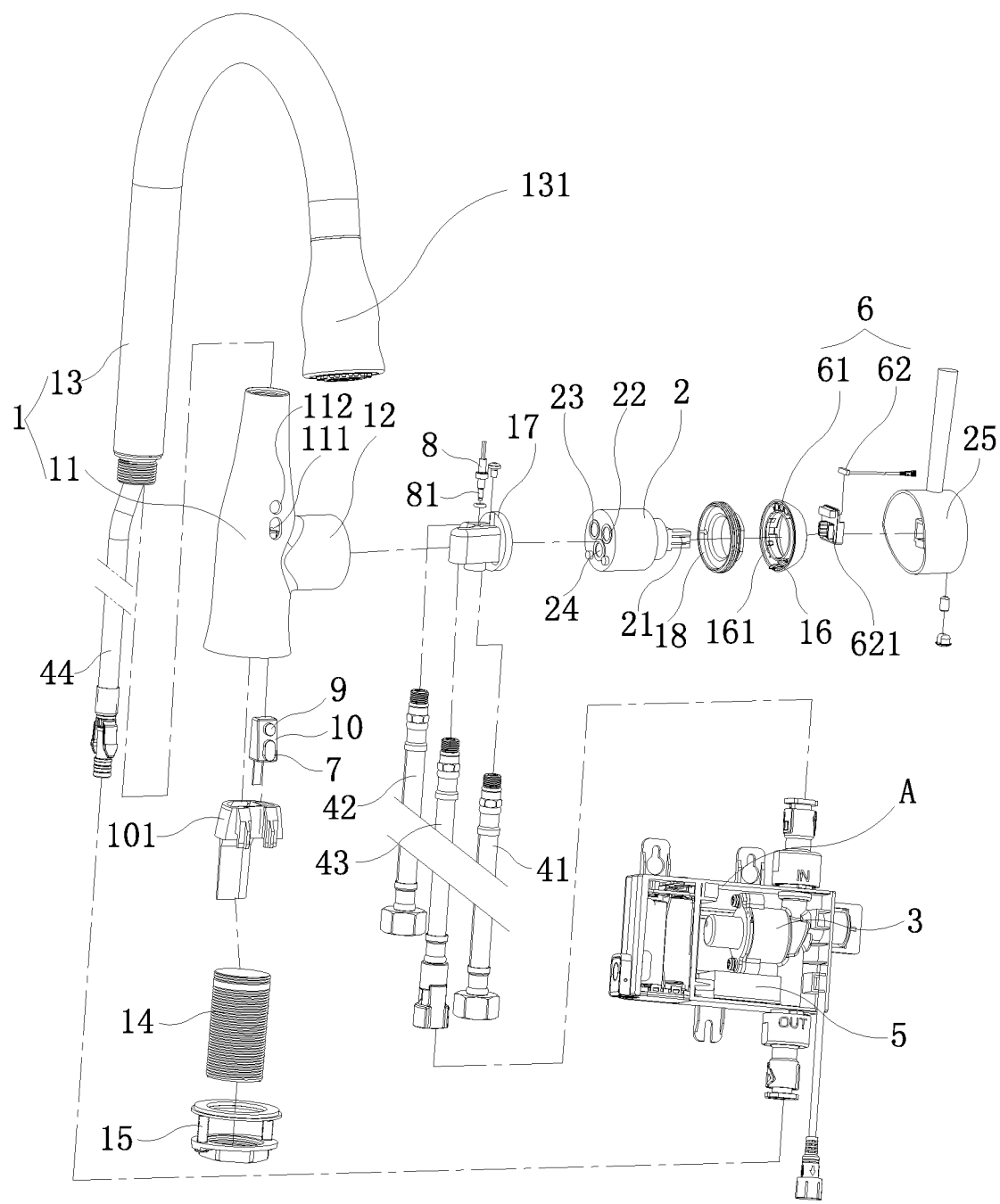
FIG. 10 is an exploded view according to a second embodiment of the present invention.
Figure 11:
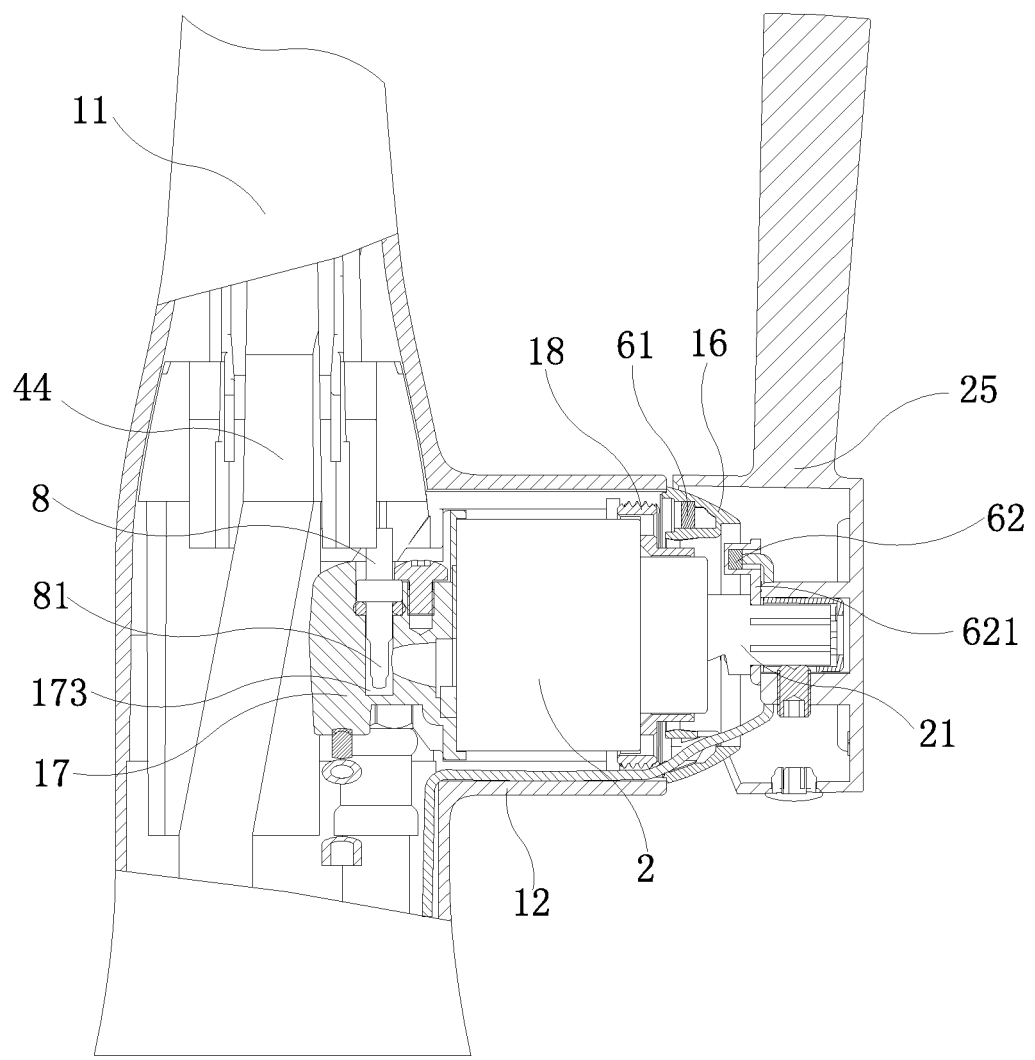
FIG. 11 is a first partial sectional view according to the second embodiment of the present invention, showing that the lever is pulled to the closed position.
Figure 12:
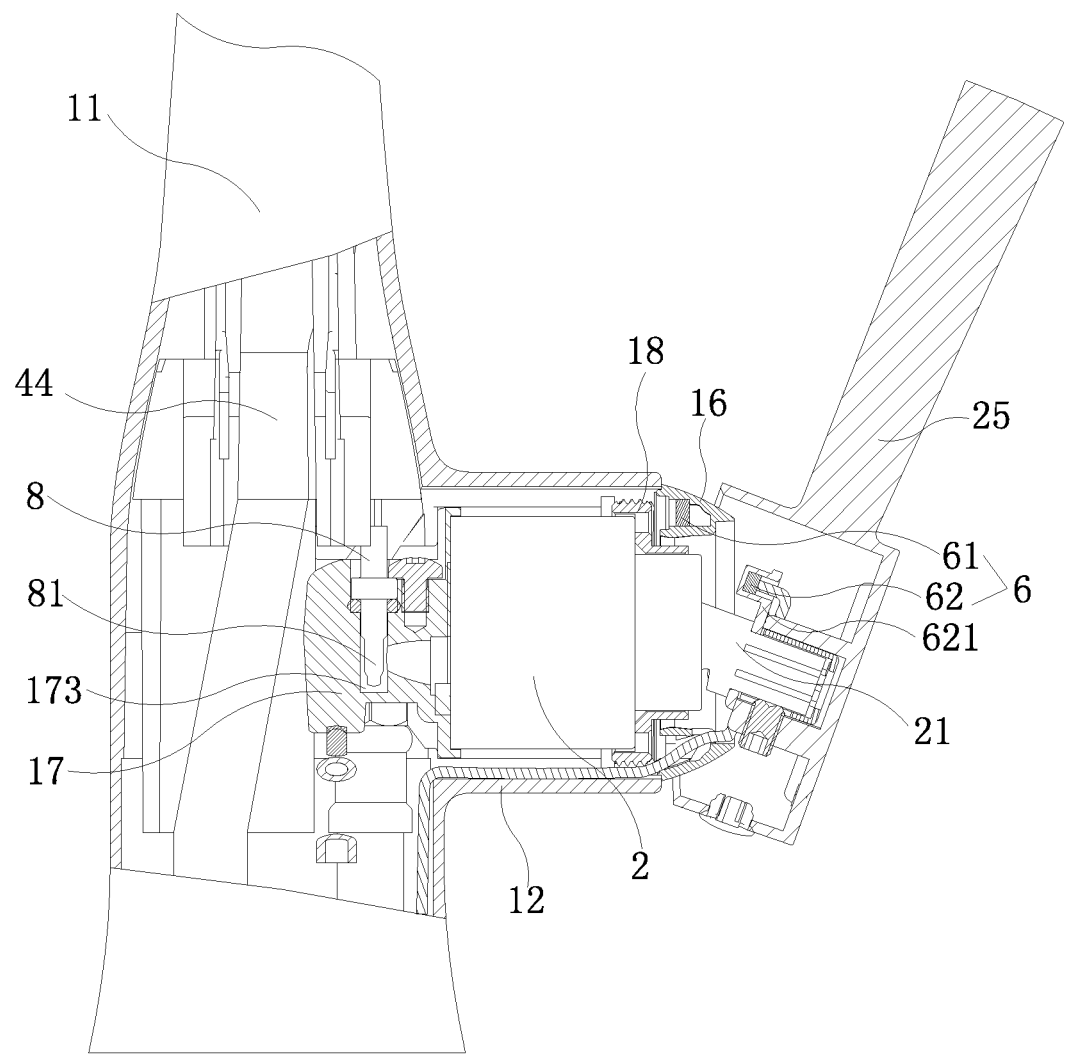
FIG. 12 is a second partial sectional view according to the second embodiment of the present invention, showing that the lever is pulled to the open position.

As shown in FIG. 10 to FIG. 12, the second embodiment is substantially similar to the first embodiment with the exceptions described hereinafter. In the first embodiment, the magnetic assembly 61 is fitted on the lever 21 of the single-handle double-control mixed water valve core 2, and the magnetic sensor 62 is fitted between the single-handle double-control mixed water valve core 2 and the mounting cylinder 12. In the second embodiment, the magnetic sensor 62 is fitted on the lever 21 of the single-handle double-control mixed water valve core 2, and the magnetic assembly 61 is fitted between the single-handle double-control mixed water valve core 2 and the mounting cylinder 12. As shown in FIG. 12, in the second embodiment, when the lever 21 is pulled to the open position, the single-handle double-control mixing valve spool 2 is opened and the lever 21 drives the magnetic sensor 62 away from the magnetic assembly 61. At this time, the magnetic sensor 62 senses that the magnetic assembly 61 is away from the magnetic sensor 62 to generate a first signal output to the controller 5. The controller 5 receives the first signal and determines that the lever 21 is pulled to the open position. As shown in FIG. 11, in the second embodiment, when the lever 21 is pulled to the closed position, the single-handle double-control mixed water valve core 2 is closed and the lever 21 drives the magnetic sensor 62 to approach the magnetic assembly 61. At this time, the magnetic sensor 62 senses that the magnetic assembly 61 is close to the magnetic sensor 62 to generate a second signal output to the controller 5. The controller 5 receives the second signal and determines that the lever 21 is pulled to the closed position. Thus, in the second embodiment, the controller 5 can detect that the lever 21 is pulled to the closed position or the open position through the magnetic induction device 6.

Figure 13:
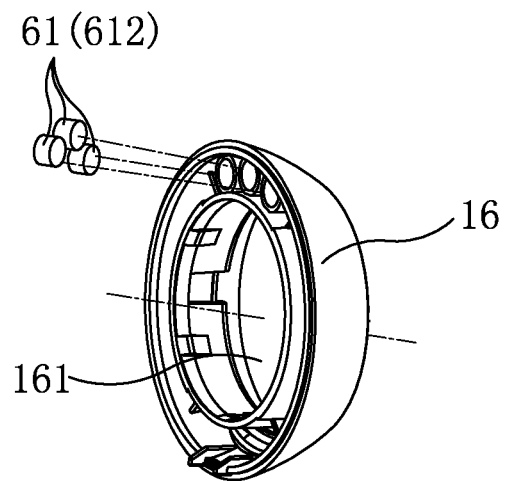
FIG. 13 is a schematic of an example of the magnetic assembly according to the second embodiment of the present invention.
Figure 14:
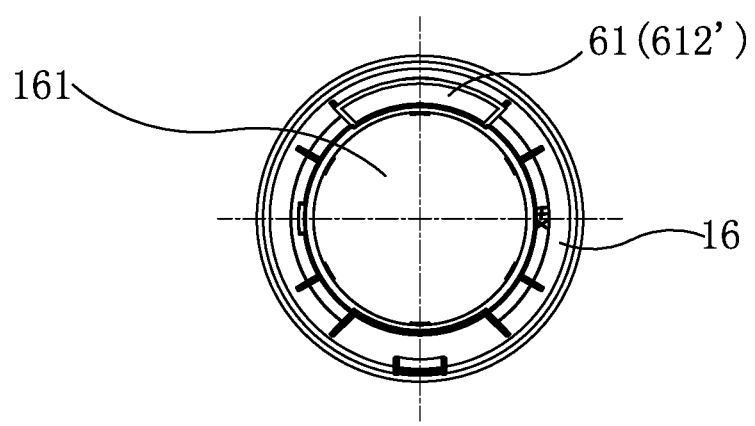
FIG. 14 is a schematic view of another example of the magnetic assembly according to the second embodiment of the present invention.

As shown in FIG. 10 to FIG. 12, in the second embodiment, the magnetic sensor 62 may be fixed in a magnetic sensor holder 621. The magnetic sensor holder 621 is fitted on the lever 21 and is in an interference fit with the lever 21, so that the magnetic sensor 62 is fitted to the rocker 21. As shown in FIG. 11 and FIG. 12, the magnetic assembly 61 is fitted in the decorative cover 16. As shown in FIG. 13, the magnetic assembly 61 may include at least three magnetic cylinders 612. The magnetic cylinders 612 are arranged in an arc shape and fitted in the decorative cover 16. The distance from each of the magnetic cylinders 612 to the center axis of the decorative cover 16 is equal. In this way, the area of the magnetic assembly 61 that can be sensed by the magnetic sensor 62 is large, thereby ensuring that the magnetic sensor 62 can sense the magnetic assembly 61 when the lever 21 is rotated. As shown in FIG. 14, the magnetic assembly 61 may include a fan-shaped magnetic plate 612'. The fan-shaped magnetic plate 612' is fitted in decorative cover 16. The center of the fan-shaped magnetic plate 612' is located on the central axis of the lever 21. In this way, the area of the magnetic assembly 61 that can be sensed by the magnetic sensor 62 is large, thereby ensuring that the magnetic sensor 62 can sense the magnetic assembly 61 when the lever 21 is rotated.

Although particular embodiments of the present invention have been described in detail for purposes of illustration, various modifications and enhancements may be made without departing from the spirit and scope of the present invention. Accordingly, the present invention is not to be limited except as by the appended claims

What is claimed is:

1. A temperature-regulating double-control automatic faucet, comprising a faucet body, a single-handle double-control mixed water valve core having a lever, a solenoid valve, a water pipe assembly, a controller, a magnetic induction device, and a proximity sensor;

the faucet body being provided with a spout and a mounting cylinder, the mounting cylinder having an inner end opening and an outer end opening;

the single-handle double-control mixed water valve core being installed in the mounting cylinder, the lever of the single-handle double-control mixed water valve core being movable between an open position and a closed position for opening and closing the single-handle double-control mixed water valve core, the lever of the single-handle double-control mixed water valve core being rotatable between a cold water position and a hot water position for controlling the proportion of cold water and hot water flowing into the single-handle double-control mixed water valve core;

the water pipe assembly including a cold water inlet pipe, a hot water inlet pipe, a primary mixed water outlet pipe and a secondary mixed water outlet pipe, one end of the hot water inlet pipe being in communication with a hot water inlet of the single-handle double-control mixed water valve core, one end of the cold water inlet pipe being in communication with a cold water inlet of the single-handle double-control mixed water valve core, one end of the primary mixed water outlet pipe being in communication with a mixed water outlet of the single-handle double-control mixed water valve core, another end of the primary mixed water outlet pipe being in communication with an inlet of the solenoid valve, one end of the secondary mixed water outlet pipe being in communication with an outlet of the solenoid valve, another end of the secondary mixed water outlet pipe being in communication with the spout of the faucet body;

the magnetic induction device being configured to detect a position change of the lever between the open position and the closed position, the magnetic induction device including a magnetic assembly and a magnetic sensor for sensing a position change of the magnetic assembly, one of the magnetic assembly and the magnetic sensor being fitted on the lever of the single-handle double-control mixed water valve core, the other of the magnetic assembly and the magnetic sensor being fitted between the single-handle double-control mixed water valve core and the mounting cylinder, the magnetic sensor being electrically connected to the controller;

the proximity sensor being configured to sense a human body, the proximity sensor being fixed on the faucet body and electrically connected to the controller;

wherein when the controller detects that the lever is pulled to the open position through the magnetic induction device, the single-handle double-control mixed water valve core is opened, and the controller first controls the solenoid valve to be opened in response to the lever being pulled to the open position, and then the controller senses the human body through the proximity sensor to control the solenoid valve to be selectively opened and closed; and wherein a handle adapted to be operated by a user is detachably connected to the lever and the one of the magnetic assembly and the magnetic sensor that is fitted on the lever is separate from the handle.

2. The temperature-regulating double-control automatic faucet as claimed in claim 1, wherein the magnetic assembly is fitted on the lever of the single-handle double-control mixed water valve core, and the magnetic sensor is fitted between the single-handle double-control mixed water valve core and the mounting cylinder.

3. The temperature-regulating double-control automatic faucet as claimed in claim 2, wherein the magnetic assembly includes a magnetic cylinder holder and at least three magnetic cylinders fitted to the magnetic cylinder holder, the magnetic cylinder holder is fixed on the lever, the magnetic cylinders are arranged in an arc shape on the magnetic cylinder holder, and a distance from each of the magnetic cylinders to a center axis of the lever is equal.

4. The temperature-regulating double-control automatic faucet as claimed in claim 2, wherein the magnetic assembly includes a magnetic plate holder and a fan-shaped magnetic plate fitted to the magnetic plate holder; the magnetic plate holder is fixed on the lever, and a center point of a radius of curvature of the fan-shaped magnetic plate is located on a central axis of the lever.

5. The temperature-regulating double-control automatic faucet as claimed in claim 2, wherein the outer end opening of the mounting cylinder is provided with a decorative cover for covering the outer end opening of the mounting cylinder, the decorative cover has a through hole for the lever to pass through; and the magnetic sensor is fixed in the decorative cover.

6. The temperature-regulating double-control automatic faucet as claimed in claim 1, wherein the magnetic sensor is fitted on the lever of the single-handle double-control mixed water valve core, and the magnetic assembly is fitted between the single-handle double-control mixed water valve core and the mounting cylinder.

7. The temperature-regulating double-control automatic faucet as claimed in claim 6, wherein the outer end opening of the mounting cylinder is provided with a decorative cover for covering the outer end opening of the mounting cylinder, the decorative cover has a through hole for the lever to pass through; the magnetic assembly includes at least three magnetic cylinders, the magnetic cylinders are arranged in an arc shape and fitted in the decorative cover, and a distance from each of the magnetic cylinders to a central axis of the decorative cover is equal.

8. The temperature-regulating double-control automatic faucet as claimed in claim 6, wherein the outer end opening of the mounting cylinder is provided with a decorative cover for covering the outer end opening of the mounting cylinder, the decorative cover has a through hole for the lever to pass through; the magnetic assembly includes a fan-shaped magnetic plate fitted in the decorative cover, and a center point of a radius of curvature of the fan-shaped magnetic plate is located on a central axis of the decorative cover.

9. The temperature-regulating double-control automatic faucet as claimed in claim 1, further comprising a temperature sensing member and an indicator light; the temperature sensing member being fixed in the faucet body and configured to sense a water temperature of water flowing out of the mixed water outlet of the single-handle double-control mixed water valve core;

the indicator light being fixed on the faucet body, the temperature sensing member and the indicator light being electrically connected to the controller;

wherein when the controller detects that the lever is pulled to the open position through the magnetic induction device, the controller controls the indicator light to work, and the controller obtains the water temperature of the water flowing out of the mixed water outlet through the temperature sensing member and controls a color of light emitted by the indicator light according to the water temperature.

10. The temperature-regulating double-control automatic faucet as claimed in claim 9, wherein both the proximity sensor and the indicator light are located on one side of the faucet body and arranged adjacent to each other.

11. A temperature-regulating double-control automatic faucet, comprising a faucet body, a single-handle double-control mixed water valve core having a lever, a solenoid valve, a water pipe assembly, a controller, a magnetic induction device, and a proximity sensor;

the faucet body being provided with a spout and a mounting cylinder, the mounting cylinder having an inner end opening and an outer end opening;

the single-handle double-control mixed water valve core being installed in the mounting cylinder, the lever of the single-handle double-control mixed water valve core being movable between an open position and a closed position for opening and closing the single-handle double-control mixed water valve core, the lever of the single-handle double-control mixed water valve core being rotatable between a cold water position and a hot water position for controlling the proportion of cold water and hot water flowing into the single-handle double-control mixed water valve core;

the water pipe assembly including a cold water inlet pipe, a hot water inlet pipe, a primary mixed water outlet pipe and a secondary mixed water outlet pipe, one end of the hot water inlet pipe being in communication with a hot water inlet of the single-handle double-control mixed water valve core, one end of the cold water inlet pipe being in communication with a cold water inlet of the single-handle double-control mixed water valve core, one end of the primary mixed water outlet pipe being in communication with a mixed water outlet of the single-handle double-control mixed water valve core, another end of the primary mixed water outlet pipe being in communication with an inlet of the solenoid valve, one end of the secondary mixed water outlet pipe being in communication with an outlet of the solenoid valve, another end of the secondary mixed water outlet pipe being in communication with the spout of the faucet body;

the magnetic induction device being configured to detect a position change of the lever between the open position and the closed position, the magnetic induction device including a magnetic assembly and a magnetic sensor for sensing a position change of the magnetic assembly, one of the magnetic assembly and the magnetic sensor being fitted on the lever of the single-handle double-control mixed water valve core, the other of the magnetic assembly and the magnetic sensor being fitted between the single-handle double-control mixed water valve core and the mounting cylinder, the magnetic sensor being electrically connected to the controller;

the proximity sensor being configured to sense a human body, the proximity sensor being fixed on the faucet body and electrically connected to the controller;

wherein when the controller detects that the lever is pulled to the closed position through the magnetic induction device, the single-handle double-control mixed water valve core is closed, and the controller controls the solenoid valve to be opened in response to the lever being pulled to the closed position; when the controller detects that the lever is pulled to the open position through the magnetic induction device, the controller senses the human body through the proximity sensor to control the solenoid valve to be selectively opened and closed; and wherein a handle adapted to be operated by a user is detachably connected to the lever and the one of the magnetic assembly and the magnetic sensor that is fitted on the lever is separate from the handle.

12. The temperature-regulating double-control automatic faucet as claimed in claim 11, wherein the magnetic assembly is fitted on the lever of the single-handle double-control mixed water valve core, and the magnetic sensor is fitted between the single-handle double-control mixed water valve core and the mounting cylinder.

13. The temperature-regulating double-control automatic faucet as claimed in claim 12, wherein the magnetic assembly includes a magnetic cylinder holder and at least three magnetic cylinders fitted to the magnetic cylinder holder, the magnetic cylinder holder is fixed on the lever, the magnetic cylinders are arranged in an arc shape on the magnetic cylinder holder, and a distance from each of the magnetic cylinders to a center axis of the lever is equal.

14. The temperature-regulating double-control automatic faucet as claimed in claim 12, wherein the magnetic assembly includes a magnetic plate holder and a fan-shaped magnetic plate fitted to the magnetic plate holder; the magnetic plate holder is fixed on the lever, and a center point of a radius of curvature of the fan-shaped magnetic plate is located on a central axis of the lever.

15. The temperature-regulating double-control automatic faucet as claimed in claim 12, wherein the outer end opening of the mounting cylinder is provided with a decorative cover for covering the outer end opening of the mounting cylinder, the decorative cover has a through hole for the lever to pass through; and the magnetic sensor is fixed in the decorative cover.

16. The temperature-regulating double-control automatic faucet as claimed in claim 11, wherein the magnetic sensor is fitted on the lever of the single-handle double-control mixed water valve core, and the magnetic assembly is fitted between the single-handle double-control mixed water valve core and the mounting cylinder.

17. The temperature-regulating double-control automatic faucet as claimed in claim 16, wherein the outer end opening of the mounting cylinder is provided with a decorative cover for covering the outer end opening of the mounting cylinder, the decorative cover has a through hole for the lever to pass through; the magnetic assembly includes at least three magnetic cylinders, the magnetic cylinders are arranged in an arc shape and fitted in the decorative cover, and a distance from each of the magnetic cylinders to a central axis of the decorative cover is equal.

18. The temperature-regulating double-control automatic faucet as claimed in claim 16, wherein the outer end opening of the mounting cylinder is provided with a decorative cover for covering the outer end opening of the mounting cylinder, the decorative cover has a through hole for the lever to pass through; the magnetic assembly includes a fan-shaped magnetic plate fitted in the decorative cover, and a center point of a radius of curvature of the fan-shaped magnetic plate is located on a central axis of the decorative cover.

19. The temperature-regulating double-control automatic faucet as claimed in claim 11, further comprising a temperature sensing member and an indicator light; the temperature sensing member being fixed in the faucet body and configured to sense a water temperature of water flowing out of the mixed water outlet of the single-handle double-control mixed water valve core;

the indicator light being fixed on the faucet body, the temperature sensing member and the indicator light being electrically connected to the controller;

wherein when the controller detects that the lever is pulled to the open position through the magnetic induction device, the controller controls the indicator light to work, and the controller obtains the water temperature of the water flowing out of the mixed water outlet through the temperature sensing member and controls a color of light emitted by the indicator light according to the water temperature.

20. The temperature-regulating double-control automatic faucet as claimed in claim 19, wherein both the proximity sensor and the indicator light are located on one side of the faucet body and arranged adjacent to each other.

* * * * *